(12) United States Patent
Monson et al.

(10) Patent No.: US 6,435,490 B1
(45) Date of Patent: Aug. 20, 2002

(54) DUAL HEMISPHERE ELASTOMER MOUNT

(75) Inventors: Robert James Monson, St. Paul; Trevor J. McCollough, Minneapolis, both of MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/779,430

(22) Filed: Feb. 8, 2001

(51) Int. Cl.⁷ .......................... F16D 41/06; F16D 41/08
(52) U.S. Cl. .................. 267/141; 267/33; 267/153; 267/294
(58) Field of Search ................. 267/153, 141, 267/33, 289, 141.1, 141.2, 140, 292, 293

(56) References Cited

U.S. PATENT DOCUMENTS

| | | | | |
|---|---|---|---|---|
| 1,936,389 A | * | 11/1933 | Hallquist | 267/33 |
| 3,767,694 A | * | 10/1973 | MacDonnell | 267/33 |
| 4,059,254 A | | 11/1977 | Fielding-Russel et al. | 267/140 |
| 4,781,365 A | * | 11/1988 | Harrison | 267/294 |
| 5,149,069 A | * | 9/1992 | Hein | 267/153 |
| 5,364,086 A | * | 11/1994 | Paton | 267/140.4 |
| 5,766,720 A | | 6/1998 | Yamagishi et al. | 428/71 |
| 5,772,191 A | * | 6/1998 | Nakano et al. | 267/289 |
| 5,957,441 A | * | 9/1999 | Tews | 267/153 |
| 6,250,617 B1 | * | 6/2001 | Tews | 267/153 |

* cited by examiner

*Primary Examiner*—Matthew C. Graham
(74) *Attorney, Agent, or Firm*—P. M. Hogan; G. W. Bowen

(57) ABSTRACT

A dual hemisphere elastomer mount having a first hemisphere composed of an elastomer and having a polar region and a base region with the polar region of the first hemisphere having a circumference smaller than a circumference of the base region of the first hemisphere; and a second hemisphere composed of an elastomer having a polar region and a base region with the polar region of the second hemisphere having a circumference smaller than a circumference of the base region of the second hemisphere, the first hemisphere securely attached to the second hemisphere at the polar region of the first hemisphere and at the polar region of the second hemisphere creating a hour-glass shaped body whereby the elastomer mount can support a housing while attenuate shocks and vibrations.

20 Claims, 2 Drawing Sheets

DUAL HEMISPHERE ELASTOMER MOUNT

FIELD OF INVENTION

This invention relates generally to shock isolators and more specifically to a dual hemisphere elastomer mount.

BACKGROUND OF THE INVENTION

Generally, the shape and configuration of elastomeric isolators have a significant effect on the shock and vibration attenuation characteristics of the elastomeric isolators. The elastomeric isolators employed in the prior art are commonly formed into geometric 3D shapes, such as spheres, squares, right circular cylinders, cones, rectangles and the like as illustrated in U.S. Pat. No. 5,776,720. These elastomeric isolators are typically attached to a housing to protect equipment within the housing from the effects of shock and vibration.

The prior art elastomeric isolators are generally positioned to rely on an axial compression of the elastomeric material or on tension or shear of the elastomeric material. Generally, if the elastomeric isolator is positioned in the axial compressive mode the ability of the elastomeric isolator to attenuate shock and vibration is limited by the compressive characteristics of the material. On the other hand, in the axial compressive mode the elastomeric isolators can be used to provide static support to a housing, which allows a single elastomeric isolator to be placed beneath the housing to support the static weight of the housing.

In general, if the elastomeric isolators are positioned in the shear or tension mode a opposed to an axial compression mode the elastomeric isolators provide better shock and vibration attenuating characteristics in response to dynamic forces due to shock and vibration. Unfortunately, elastomeric isolators, which operate in a shear or tension mode or in the axial compression mode, can generally not be placed beneath a housing to provide static support to the housing without substantially effecting the shock and vibration attenuation characteristics of the elastomeric isolators. Consequently, to provide static support for a housing, as well as effective shock and vibration attenuation characteristics the elastomeric isolators, which operate in the shear or tension mode, are generally placed along side or above a housing so that the elastomeric isolators can function in a shear or tension mode while supporting the static weight of the housing. The positioning in a shear or tension mode can require placing matching elastomeric isolators on each side of the housing. In contrast, the present invention provides an elastomeric isolator that provides axial offset compressive support for a housing. As the present invention does not require pairing with other elastomeric isolators a single elastomeric isolator can be placed beneath a housing to provide static support for the housing through an axial offset compressive axis while at the same time allowing the elastomeric isolator to retain the necessary dynamic attenuation characteristics to thereby effectively reduce shock and vibration to the housing.

SUMMARY OF THE INVENTION

Briefly, the invention comprises a dual hemisphere elastomer mount to create an offset in the compression path through the mount. The dual hemisphere elastomer mount is composed of an elastomer and has a first hemisphere having a polar region and a base region with the polar region of the first hemisphere having a circumference smaller than a circumference of the base region of the first hemisphere; and a second hemisphere having a polar region and a base region with the polar region of the second hemisphere having a circumference smaller than a circumference of the base region of the second hemisphere. The first hemisphere is joined to the second hemisphere at the polar region of the first hemisphere and at the polar region of the second hemisphere creating a hour-glass shaped body.

DESCRIPTION OF THE PREFERRED EMBODIMENT

Figure 1:
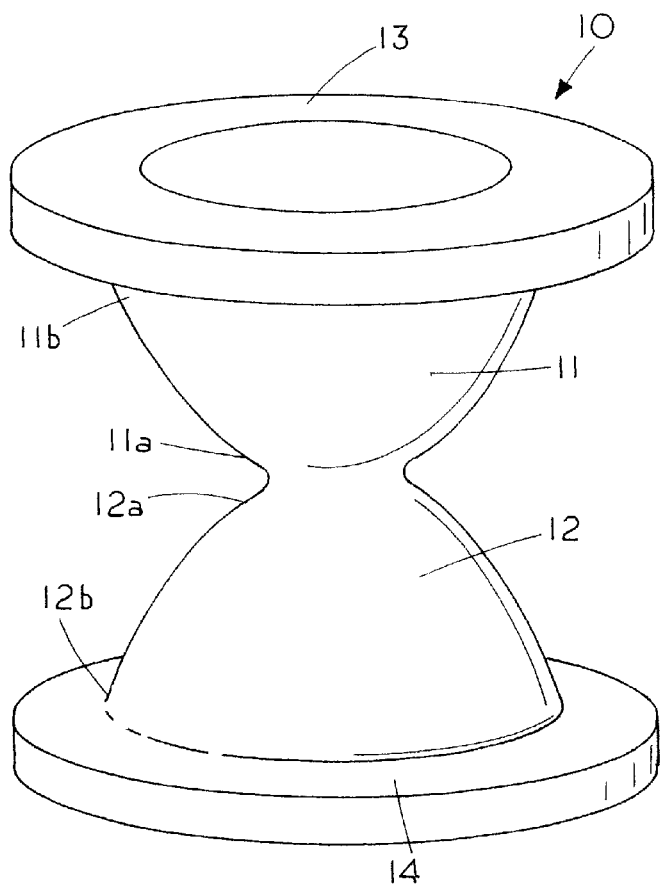
FIG. 1 shows a perspective view of a dual hemisphere elastomer mount of the present invention.

Referring to FIG. 1, reference numeral 10 generally identifies a dual hemisphere elastomer mount of the present invention for supporting a housing member such as a cabinet and attenuating the forces of various shocks and vibrations. Reference numeral 11 identifies a first hemisphere composed of an elastomer such as rubber, plastic, or polyvinyl and having a polar region 11a and a base region 11b. The circumference of the polar region 11a of first hemisphere 11 is smaller than the circumference of the base region 11b of first hemisphere 11. Securely attached to first hemisphere 11 is a second hemisphere 12 composed of an elastomer such as rubber, plastic, or polyvinyl and having a polar region 12a and a base region 12b. The circumference of the polar region 12a of second hemisphere 12 is smaller than the circumference of the base region 12b of first hemisphere 12. First hemisphere 11 is joined to second hemisphere 12 at the polar region 11a of first hemisphere 11 and at the polar region 12a of second hemisphere 12 creating a hour-glass shaped shock isolator. The hour-glass shape of the shock isolator allows the shock isolator to create an offset compressive path for static forces. When dynamic forces, such as shocks or vibrations, are applied to dual hemisphere elastomer mount 10. The mount provides shear and tension resistance. Joined to the base region 11b of first hemisphere 11 is a first annular ring 13 for supporting a housing such as a cabinet. First annular ring 13 allows dual hemisphere elastomer mount 10 additional support of a housing by providing additional surface area for dual hemisphere elastomer mount 10 to engage a housing surface such as a cabinet housing. Joined to the base region 12b of second hemisphere 12 is a second annular ring 14. Second annular ring 14 helps secure dual hemisphere elastomer mount 10 to a support surface such as a floor by providing dual hemisphere elastomer mount 10 with additional surface area to engage the support surface.

Figure 2:
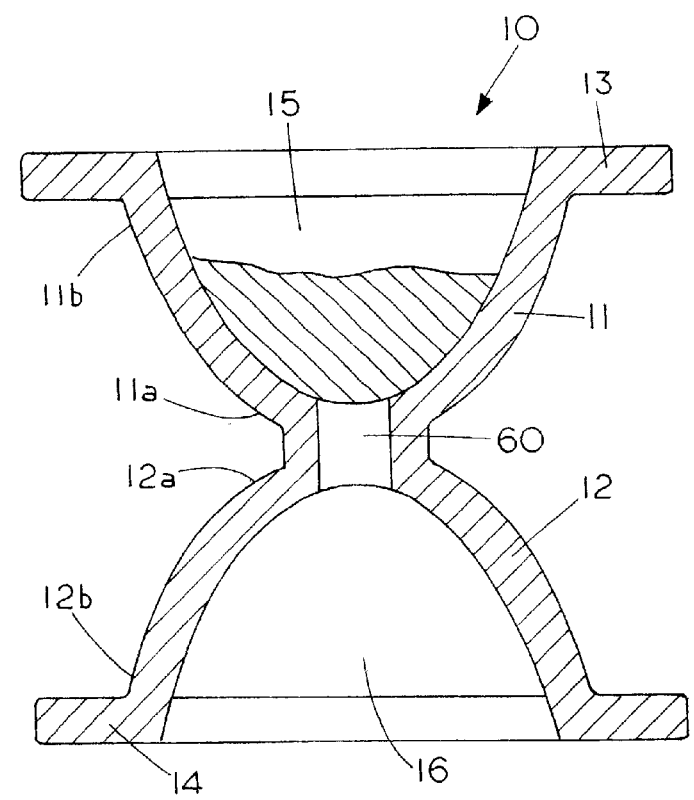
FIG. 2 is a cross sectional view of the dual hemisphere elastomer mount of FIG. 1.

FIG. 2 is a cross sectional view of the dual hemisphere elastomer mount of FIG. 1. As shown, first hemisphere 11 is joined to second hemisphere 12 at the polar region 11a of first hemisphere 11 and at the polar region 12a of second hemisphere 12 creating a hourglass shaped shock isolator. Joined to the base region 11b of first hemisphere 11 is a first annular ring 13 and securely attached to the base region 12b of second hemisphere 12 is a second annular ring 14. Locate in the first hemisphere 11 is a first hemispherical cavity 15. Located in the second hemisphere 12 is a second hemispherical cavity 16. Connecting first hemisphere 11 to second hemisphere 12 is an air passage 60 located between the polar region 11a of first hemisphere 11 and the polar region 12a of the second hemisphere 12 allowing for the flow of air between the first cavity 15 and the second cavity 16. Although the embodiment of FIG. 2 has an air passage way, other embodiments of the invention may contain a solid region between the polar region 11a of first hemisphere 11 and the polar region 12a of the second hemisphere 12 to block flow of fluids there through.

Figure 3:
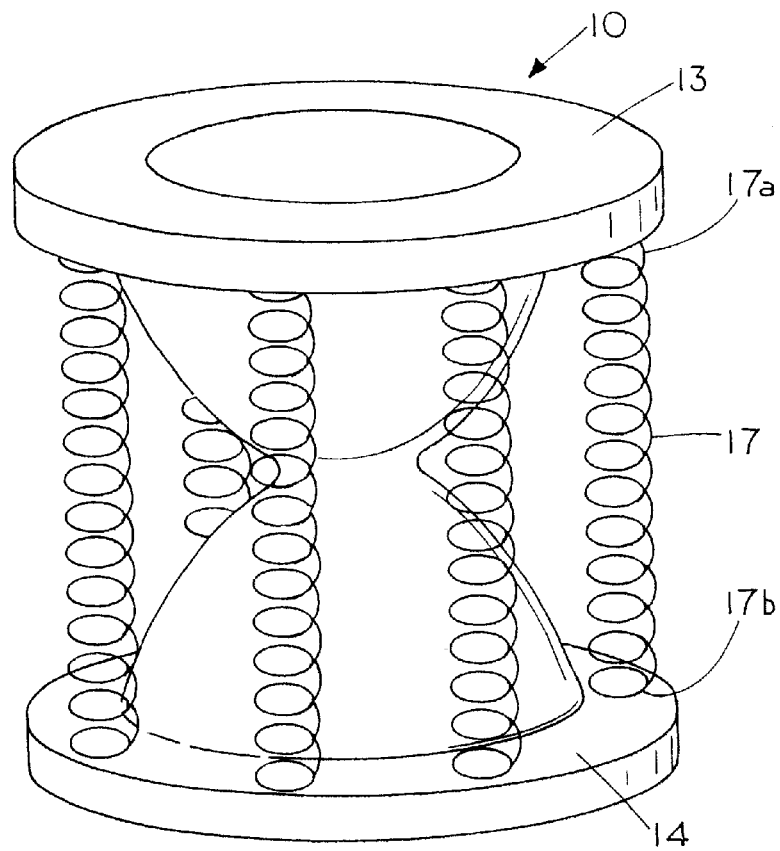
FIG. 3 is a perspective view showing the dual hemisphere elastomer mount of the present invention with a plurality of compression springs attached.
Figure 4:
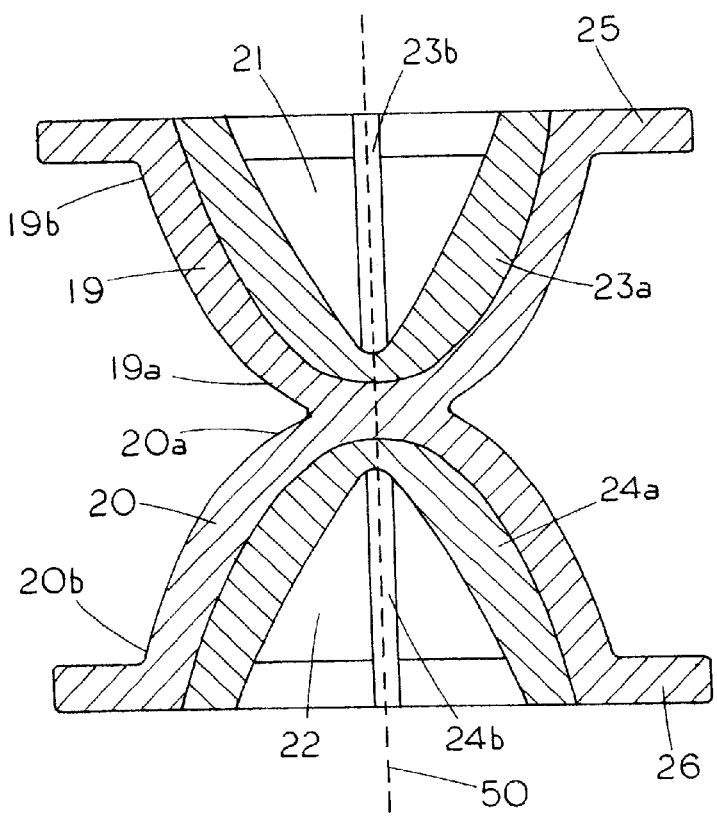
FIG. 4 is a cross sectional view showing a dual hemisphere elastomer mount having a set of circumferential ribs.

FIG. 3 is a perspective view showing the dual hemisphere elastomer mount 10 of the present invention with a plurality of compression springs 17 attached. Each of compression springs 17 have a first end 17a and a second end 17b, the first end 17a of each of compression springs 17 engaging first annular ring 13 and second end 17b of each of compression springs 17 engaging the second annular ring 14. The use of compression springs 17 provide for a change in the dampening characteristics of dual hemisphere elastomer mount 10 as well as providing for additional compressive support FIG. 4 shows a cross sectional view of a dual hemisphere elastomer mount 18 having a first set of circumferential ribs 23a and a second set of circumferential ribs 23b joined to an interior wall 21 of the first hemisphere 19 and a first set of circumferential ribs 24a and a second circumferential ribs 24b joined to an interior wall 22 of the second hemisphere 20. In the embodiment shown, the circumferential ribs and hemispheres provide for a one-piece integral mount.

First set of circumferential ribs 23a is located in the first hemisphere 19 of dual hemisphere elastomer mount 18. First set of circumferential ribs 23a engages an interior wall 21 of the first hemisphere 19 and is parallel with a central axis 50, extending through the first hemisphere 19 and the second hemisphere 20. Second set of circumferential ribs 23b engages the interior wall 22 of the first hemisphere 19 and is also parallel to central axis 50 but mutually perpendicular to first set of circumferential ribs 23a.

First set of circumferential ribs 24a is located in the second hemisphere 20 of dual hemisphere elastomer mount 18. First set of circumferential ribs 24a engages an interior wall 22 of the first hemisphere 20 and is parallel with a central axis 50. Second set of circumferential ribs 24b engages the interior wall 22 of second hemisphere 20 and is also parallel to central axis 50 but mutually perpendicular to first set of circumferential ribs 24a. The addition of the circumferential ribs to dual hemisphere elastomer mount 18 provide predictability to the deflection of dual hemisphere elastomer mount 18.

In the embodiment shown in FIG. 4 the circumferential ribs 23a and 23b integrally molded to hemisphere 19 and circumferential ribs 24a and 24b are integrally molded to hemisphere to form a one-piece elastomer.

The present invention also includes a method of damping dynamic forces comprising the steps of: (1) forming a hour-glass shaped dual hemisphere elastomer mount 10 from a first hollow hemisphere 11 composed of an elastomer and a second hollow hemisphere 12 composed of an elastomer; (2) attaching a first annular ring 13 to the first end of the dual hemisphere elastomer mount and securely attaching a second annular ring 14 to the second end of the dual hemisphere elastomer mount To use the isolator one secures a first end of the dual hemisphere elastomer mount 10 to a first member such as a cabinet housing; and secures a second end of the dual hemisphere elastomer mount 10 to a second member such as a support surface to provide for support of the dual hemisphere elastomer mount between the first member and the second member. To provide additional dampening to the isolator one can perform the additional step of adding a high-dampening material within the hollow area of one or more hemispheres.

If desired one can change the damping characteristic of the dual hemisphere elastomer mount by connecting the first annular ring to the second annular ring by a set of compression springs.

In order to provide deflection direction to the elastomer mount one can secure a plurality of circumferential ribs 23a and 23b to the first hemisphere 19 and secure a plurality of circumferential ribs 24a and 24b to the second hemisphere 20. The ribs although made of an elastomer material provide predictability to the direction of deflection of the dual hemisphere elastomer mount as they help maintain the hemisphere in alignment with axis 50 by offering resistance to the hemisphere becoming mis-aligned. When forces are applied to a wall of dual hemisphere elastomer mount 10 it creates an offset path for compressive forces and attenuates dynamic forces to the ribs and walls of the hemispheres of the dual hemisphere elastomer mount.

If desired one can place a damping material within the hemisphere to provide for more dampening.

We claim:

1. A dual hemisphere elastomer mount comprising:
   a. a first hemisphere composed of an elastomer, said first hemisphere having a polar region and a base region, the polar region of said first hemisphere having an outer circumference smaller than an inner circumference of the base region of said first hemisphere to place the first hemisphere in a shear mode by providing for an axial offset compressive path; and
   b. a second hemisphere composed of an elastomer, said second hemisphere having a polar region and a base region, the polar region of said second hemisphere having an outer circumference smaller than an inner circumference of the base region of said second hemisphere to place the second hemisphere in a shear mode by providing for an axial offset compressive path, the polar region of the first hemisphere joined to the polar region of said second hemisphere creating an hour-glass shaped body whereby the elastomer mount can support a housing while attenuating shocks and vibrations.

2. The dual hemisphere elastomer mount of claim 1 including a first annular ring joined to the base region of said first hemisphere and a second annular ring joined to the base region of said second hemisphere.

3. The dual hemisphere elastomer mount of claim 2 including a first hemispherical cavity located in the first hemisphere and a second hemispherical cavity located in the second hemisphere.

4. The dual hemisphere elastomer mount of claim 3 including a set of compression springs each having a first end and a second end, the first end of each of the compression springs engaging the first annular ring and the second end of each of the compression springs engaging the second annular ring to thereby surround the peripheral of the hour-glass shaped body of the elastomer mount for changing the dampening characteristic of the dual hemisphere elastomer mount.

5. The dual hemisphere elastomer mount of claim 4 including an air passage located between the polar region of the first hemisphere and the polar region of the second hemisphere allowing for the flow of air between the cavity of said first hemisphere and the cavity of said second hemisphere.

6. The dual hemisphere elastomer mount of claim 4 including a first set of circumferential ribs and a second set of circumferential ribs located in the first hemisphere, the first set of circumferential ribs engaging an interior wall of the first hemisphere and parallel to a central axis, the central axis extending through the first hemisphere and the second hemisphere, the second set of circumferential ribs engaging the walls of the first hemisphere, said second set of circumferential ribs parallel to the central axis but mutually perpendicular to the first set of circumferential ribs.

7. The dual hemisphere elastomer mount of claim 6 including a first set of circumferential ribs and a second set of circumferential ribs located in the second hemisphere, the first set of circumferential ribs in the second hemisphere engaging an interior wall of the second hemisphere and parallel to the central axis, the second set of circumferential ribs in the second hemisphere engaging the walls of the second hemisphere parallel to the central axis but mutually perpendicular to the first set of circumferential ribs of the second hemisphere.

8. The dual hemisphere elastomer mount of claim 1 wherein the first hemisphere and the second hemisphere comprises an integral one-piece mount.

9. A shock isolator comprising:
   a. a first hemisphere composed of an elastomer, said first hemisphere having a cavity, said first hemisphere having a polar region and a base region, the polar region of said first hemisphere having an outer circumference smaller than an inner circumference of the base region of said first hemisphere to place the first hemisphere in a shear mode by providing for an axial offset compressive path;
   b. a second hemisphere composed of an elastomer, said second hemisphere having a cavity, said second hemisphere having a polar region and a base region, the polar region of said second hemisphere having an outer circumference smaller than an inner circumference of the base region of said second hemisphere to place the first hemisphere in a shear mode by providing for an axial offset compressive path, the polar region of said first hemisphere joined to the polar region of said second hemisphere creating an hour-glass shaped body;
   c. a first annular ring, said first annular ring securely attached to the base region of said first hemisphere; and
   d. a second annular ring, said second annular ring securely attached to the base region of said second hemisphere whereby the shock isolator can support a housing while attenuating shocks and vibrations.

10. The shock isolator of claim 9 including an air passage located between the polar region of the first hemisphere and the polar region of the second hemisphere allowing for the flow of air between the first cavity and the second cavity.

11. The shock isolator of claim 9 including a set of compression springs having a first end and a second end, the first end of each of the compression springs engaging the first annular ring and the second end of each of the compression springs engaging the second annular ring to thereby surround the peripheral of the hour-glass shaped body of the shock isloator for changing the dampening characteristic of said shock isolator.

12. The shock isolator of claim 9 including a first set of circumferential ribs and a second set of circumferential ribs located in the first hemisphere, the first set of circumferential ribs engaging an interior wall of the first hemisphere and parallel to a central axis, said central axis extending through the first hemisphere and the second hemisphere, the second set of circumferential ribs engaging the walls of the first hemisphere parallel to the central axis of the first hemisphere but mutually perpendicular to the first set of circumferential ribs.

13. The shock isolator of claim 11 including a first set of circumferential ribs and a second set of circumferential ribs located in the second hemisphere, the first set of circumferential ribs in the second hemisphere engaging an interior wall of the second hemisphere and parallel to the central axis, the central axis extending through the second hemisphere, the second set of circumferential ribs engaging the walls of the second hemisphere parallel to the central axis of the second hemisphere but mutually perpendicular to the first set of circumferential ribs of the second hemisphere.

14. A method of attenuating shocks and vibrations comprising:
   a. forming a hour-glass shaped dual hemisphere elastomer mount from a first hollow hemisphere composed of an elastomer having an outer circumference of a polar region smaller than an inner circumference of a base region and a second hollow hemisphere composed of an elastomer having an outer circumference of a polar region smaller than an inner circumference of a base region;
   b. securing a first end of the dual hemisphere elastomer mount to a first member; and
   c. securing a second end of the dual hemisphere elastomer mount to a second member to provide for support of the dual hemisphere elastomer mount between the first member and the second member whereby a wall of said dual hemisphere elastomer mount provides an offset in the compressive path.

15. The method of claim 14 including the step of securely attaching a first annular ring to the first end of the dual hemisphere elastomer mount and securely attaching a second annular ring to the second end of the dual hemisphere elastomer mount.

16. The method of claim 15 wherein the step of securing the first end of the dual spherical elastomer mount to a first member comprises securing the first end of the dual hemisphere elastomer mount to a cabinet housing.

17. The method of claim 16 wherein the step of securing the second end of the dual spherical elastomer mount to a second member comprises securing the second end of the dual hemisphere elastomer mount to a support surface.

18. The method of claim 17 including the step of changing the damping characteristic of the dual hemisphere elastomer mount by connecting the first annular ring to the second annular ring by a set of compression springs.

19. The method of claim 18 including the step of securing a plurality of circumferential ribs to a wall of said first hemisphere and securing a plurality of circumferential ribs to a wall of said second hemisphere to provide predictability to the deflection of said dual hemisphere elastomer mount.

20. The method of claim 16 including the step of adding a dampening material within the first hollow hemisphere to provide additional dampening to the isolator.

* * * * *